US 11,575,288 B2

(12) United States Patent
Tang et al.

(10) Patent No.: US 11,575,288 B2
(45) Date of Patent: Feb. 7, 2023

(54) HAIRPIN WINDING ELECTRIC MACHINE

(71) Applicant: FORD GLOBAL TECHNOLOGIES, LLC, Dearborn, MI (US)

(72) Inventors: Chun Tang, Canton, MI (US); Adeeb Ahmed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 555 days.

(21) Appl. No.: 16/740,798

(22) Filed: Jan. 13, 2020

(65) Prior Publication Data
US 2021/0218305 A1     Jul. 15, 2021

(51) Int. Cl.
H02K 3/28     (2006.01)
H02K 1/16     (2006.01)
H02K 15/02    (2006.01)
H02K 15/04    (2006.01)
H02K 3/12     (2006.01)

(52) U.S. Cl.
CPC .............. *H02K 3/28* (2013.01); *H02K 1/16* (2013.01); *H02K 3/12* (2013.01); *H02K 15/024* (2013.01); *H02K 15/0421* (2013.01); *H02K 2213/03* (2013.01)

(58) Field of Classification Search
CPC .............. H02K 3/12; H02K 3/14; H02K 3/28
See application file for complete search history.

(56) References Cited

U.S. PATENT DOCUMENTS

| 3,325,661 | A  |    | 6/1967  | Parsons |            |
|-----------|----|----|---------|---------|------------|
| 6,498,414 | B2 |    | 12/2002 | Asao    |            |
| 7,034,428 | B2 |    | 4/2006  | Cai et al. |         |
| 9,899,888 | B2 | *  | 2/2018  | Shibata | ....... H02K 3/28 |
| 2021/0159743 | A1 | * | 5/2021 | Neet    | ....... H02K 3/28 |

* cited by examiner

*Primary Examiner* — Quyen P Leung
*Assistant Examiner* — Minki Chang
(74) *Attorney, Agent, or Firm* — David B Kelley; Brooks Kushman P.C.

(57) ABSTRACT

An electric machine includes a stator core and a hairpin winding. The stator core defines slots that are circumferentially arranged between an inner diameter and an outer diameter of the stator core. Each slot has a plurality of pin positions that is arranged in a direction that extends from the inner diameter toward the outer diameter. The hairpin winding has a plurality of paths of interconnected hairpins that correspond to a first electrical phase of the electric machine. The hairpins are arranged to occupy a portion of the pin positions according to a pattern that repeats at angular intervals along a circumference of the stator core. The pattern includes hairpins occupying each pin position within a first of the slots, harpins occupying exactly half the pin positions within a second of the slots, and harpins occupying exactly half the pin positions within a third of the slots.

19 Claims, 4 Drawing Sheets

US 11,575,288 B2

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

An electric machine includes a stator core and a hairpin winding. The stator core defines slots that are circumferentially arranged between an inner diameter and an outer diameter of the stator core. Each slot has a plurality of pin positions that is arranged in a direction that extends from the inner diameter toward the outer diameter. The hairpin winding has first, second, third, and fourth paths of interconnected hairpins that correspond to a first electrical phase of the electric machine. The first, second, third, and fourth paths are arranged to occupy a portion of the pin positions according to a first pattern that repeats at angular intervals along a circumference of the stator core. The first pattern includes hairpins from the first and second paths occupying each pin position within a first of the slots, hairpins from the third path occupying exactly half the pin positions within a second of the slots, and hairpins from the fourth path occupying exactly half the pin positions within a third of the slots. The second and third of the slots straddle the first of the slots.

An electric machine includes a stator core and a hairpin winding. The stator core defines slots that are circumferentially arranged between an inner diameter and an outer diameter of the stator core. Each slot has a plurality of pin positions that is arranged in a direction that extends from the inner diameter toward the outer diameter. The hairpin winding has first, second, third, and fourth paths of interconnected hairpins that correspond to a first electrical phase of the electric machine. The first, second, third, and fourth paths are arranged to occupy a portion of the pin positions according to first and second patterns that repeat at angular intervals along a circumference of the stator core. The first pattern includes hairpins from the first and second paths occupying pin positions within a first of the slots, hairpins from the third path occupying pin positions within a second of the slots, and hairpins from the fourth path occupying pin positions within a third of the slots. The second and third of the slots are disposed on opposing sides of the first of the slots. The second pattern includes, hairpins from the third and fourth paths occupying pin positions within a fourth of the slots, hairpins from the first path occupying pin positions within a fifth of the slots, and hairpins from the second path occupying pin positions within a sixth of the slots. The fifth and sixth of the slots are disposed on opposing sides of the fourth of the slots.

An electric machine includes a stator core and a hairpin winding. The stator core defines slots that are circumferentially arranged between an inner diameter and an outer diameter of the stator core. Each slot has a plurality of pin positions that is arranged in a direction that extends from the inner diameter toward the outer diameter. The hairpin winding has a plurality of paths of interconnected hairpins that correspond to a first electrical phase of the electric machine. The hairpins are arranged to occupy a portion of the pin positions according to a pattern that repeats at angular intervals along a circumference of the stator core. The pattern includes hairpins occupying each pin position within a first of the slots, harpins occupying exactly half the pin positions within a second of the slots, and harpins occupying exactly half the pin positions within a third of the slots. The second and third of slots straddle the first of the slots.

DETAILED DESCRIPTION

Figure 1:
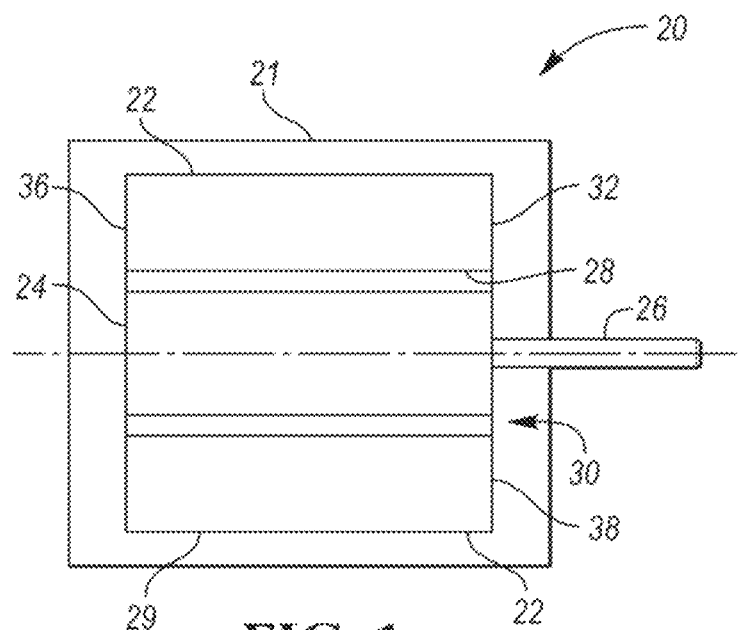
FIG. 1 is a schematic diagram of an electric machine.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Double-layer windings may be desirable for electric machine stator coils due to enhanced torque ripple and noise, vibration, and harshness (NVH) performance. Double-layer winding may also allow for an increased number of coils (compared with single layer winding) without increasing the number of slots in the stator, which may cause the need to narrow stator teeth width. Generally, double-layer windings are windings arranged such that two different electrical phases share the same slot location within the stator. At the same time, hairpin winding technology may be desirable related to the compactness, high fill factor, superior thermal performance, automated manufacturability as well as other benefits. Despite these advantages, hairpin technology can limit the available options for making connections between the conductors. Creating a double-layer winding with a hairpin winding configuration may cause the need for complicated hairpin formations, leading to an increase in cost and lowering compactness.

Described in more detail below, the present disclosure presents a unique connection arrangement to form a double-layer winding using hairpin technology with minimal changes in the basic hairpin geometry employed by a single-layer counterpart. Minimal modifications are made in a limited number of connections leaving the vast majority of the hairpin geometry unaltered. The modified connections also do not require additional jumpers or extra welding. Since the geometry is largely unmodified, the crown side formation of each hairpin remains simple and avoids the need for sharp bending of the hairpin conductor during forming. The proposed winding diagram lowers copper loss and has a minimum end-turn length by utilizing hairpins that are disposed in pin positions of the slots in the stator core in an alternating short-pitch and long-pitch manner. There are four individual paths for a single phase. These four paths are paired to make two series connections. Pairs are chosen to maintain balanced operation. Since the winding end-turn length is shorter, the copper loss is lowered, and it is more feasible and easier to manufacture the winding.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by an electrical power source such as a traction battery of the vehicle. The traction battery may supply a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a suitable traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
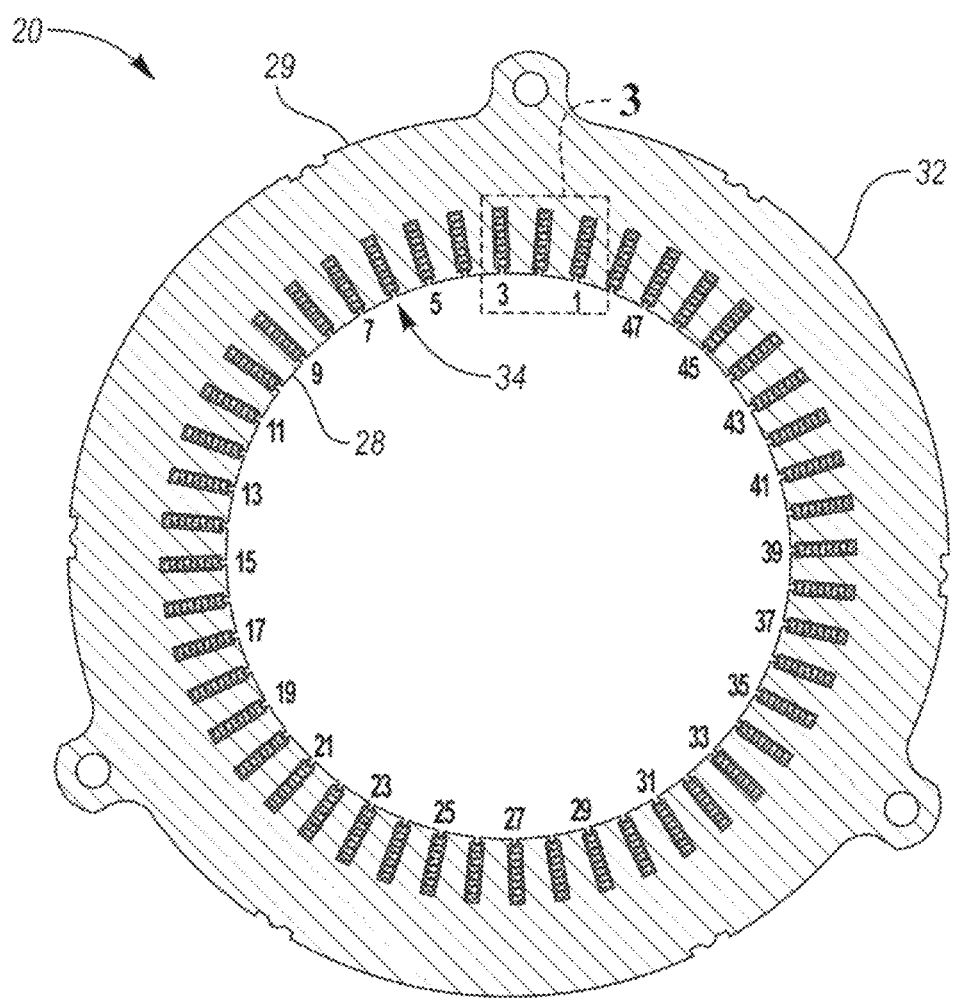
FIG. 2 is a cross-sectional end view of a stator of the electric machine.

Referring to FIGS. 1 and 2, the electric machine 20 includes a housing 21 that encloses the stator 22 and the rotor 24. The stator 22 is fixed to the housing 21 and includes a cylindrical stator core 32 having an inner diameter (ID) 28 that defines a hole 30 and an outer diameter (OD) 29. The stator core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a shaft 26 that extends through the housing 21. The shaft 26 is configured to couple with a drivetrain of the vehicle to output torque for vehicle propulsion or receive mechanical regenerative energy from vehicle motion.

The stator core 32 defines circumferentially-arranged slots 34 (see e.g., FIG. 2) around the stator core 32 and extending outward from the inner diameter 28. The slots 34 may be equally spaced around the circumference, may be circumferentially arranged between the inner diameter 28 and the outer diameter 29 of the stator core 32 (e.g., the slots 34 may extend radially from the inner diameter 28 to the outer diameter 29 of the stator core 32), and may extend axially from a first end 36 of the stator core 32 to a second end 38. Each slot 34 has a plurality of pin positions that is arranged in a direction that extends from the inner diameter 28 toward the outer diameter 29 of the stator core. In the illustrated embodiment, the stator core 32 defines forty-eight slots and has eight poles, but the stator core 32 may include more or fewer slots and/or poles in other embodiments. For example, the stator core 32 may define seventy-two slots and have eight poles.

The slots 34 are spaced by a circumferential distance measured between the center lines of two adjacent slots. This distance can be used as a unit of distance (hereinafter "a slot") for relating to, and measuring, other components of the stator 22. The distance unit "slot" is also sometimes referred to as "slot pitch" or "slot span." The slots 34 are also referenced by numbers 1 through 48 in the counterclockwise direction with the odd number slots being labeled for convenience. The slots may be characterized as odd slots (i.e., slots 1, 3, 5, etc.) and even slots (i.e., slots 2, 4, 6, etc.). The odd and even designation is for ease of description in explaining the arrangement of the windings 40, and the structure of odd and even slots may be the same.

The electric machine 20 includes hairpin windings 40 routed through the slots 34 of the stator core 32. Hairpin winding configurations can improve efficiency for electric machines used in vehicles as well as other applications. The hairpin windings 40 improve efficiency by providing a greater amount of stator conductors to reduce resistance of the winding 40 without encroaching into space reserved for the electrical steel and the magnetic flux path. The hairpin windings 40 may be arranged as wave windings in which the windings 40 weave from pole to pole in a wave-like pattern.

One particular challenge with hairpin winding is matching the electric machine design to the desired torque-speed curve. An important step in configuring an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While such arrangements may also be available for hairpin windings, the limiting factors are very different for pre-formed hairpins, thus resulting in smaller range of feasible choices. More specifically, while the possible number of poles, slots per pole, and layers can be the same between the two technologies, it is not practical using a hairpin winding to have as many turns per coil as in a stranded winding. Each hairpin needs to be connected to the next hairpin by welding, soldering or other suitable electrical connection, and needs to be bent according to a specific shape in order to make the connection possible. This limits the number and size of the conductors that can be within a single slot. An additional challenge is creating parallel circuits that are balanced (i.e., not causing large circulating currents in the loop formed by the parallel circuits due do dissymmetry) and have reasonably complex connections.

The electric machine 20 of the present disclosure solves these and other problems. The electric machine 20 may be a three-phase current electric machine in which the hairpin windings 40 are arranged in a U phase, a V phase, and a W phase. The phases may be referred to first, second, and third phases in any order. In the examples of the present disclosure, each phase includes a plurality of individual hairpin conductors arranged in parallel winding paths.

Figure 3:
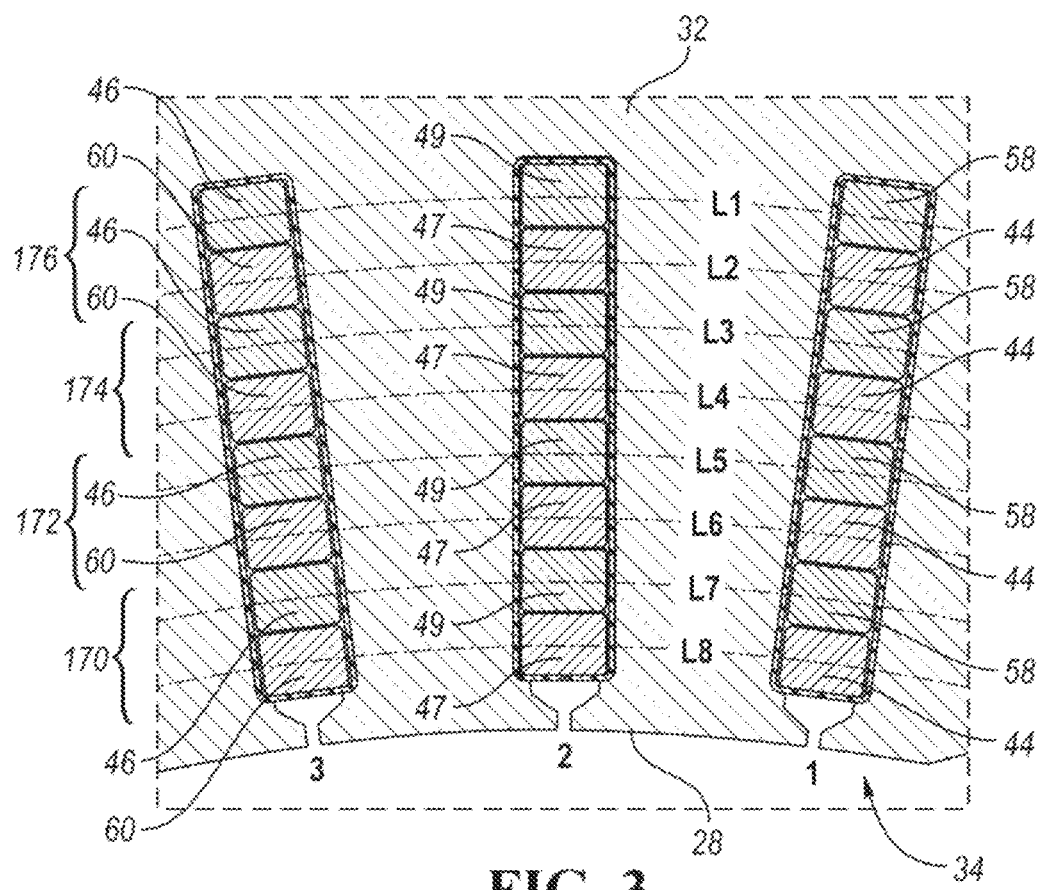
FIG. 3 is a magnified view of a portion of FIG. 2.

Referring to FIG. 3, the slots 34 may include an inner radial layer 170 of hairpins, an inner middle radial layer 172 of hairpins, an outer middle radial layer 174 of hairpins, and an outer radial layer 176 of hairpins. Each of the layers may include at least two radial pin positions that are adjacent to each other. In the illustrated embodiment, each slot 34 has eight sequential pin positions (i.e., L1 through L8) in a one-by-eight linear arrangement, however, other arrangements are contemplated. The first position L1, is nearest the OD 29 of the stator core 32 and the eighth position L8 is nearest the ID 28 of the stator core 32. The innermost radial layer 170 includes both the seventh position L7 and the eighth position L8. The inner middle radial layer 172 includes both the fifth position L5 and the sixth position L6. The outer middle radial layer 174 includes both the third position L3 and the fourth position L4. The outermost radial layer 176 includes both the first position L1 and the second position L2.

In some examples, each of the slots 34 contains windings corresponding to a single electrical phase. In other examples, and as explained in more detail below, double-layer windings are arranged such that certain slots contain windings corresponding to at least two electrical phases in a single slot. The phases are arranged in groups to occupy adjacent slots in each of the poles.

Figure 4:
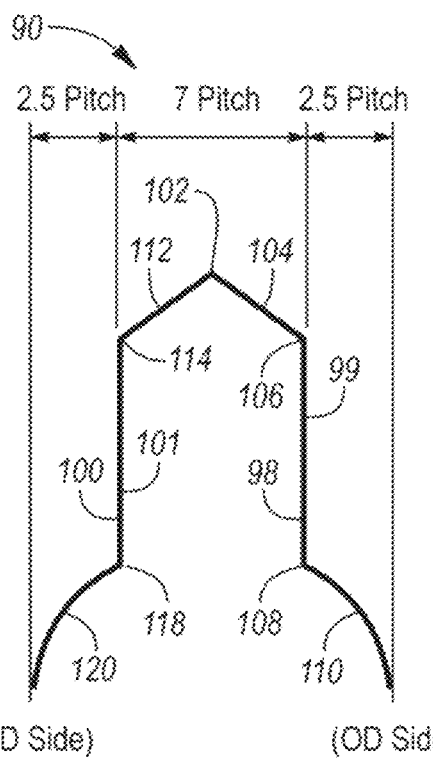
FIG. 4 is a front view of a hairpin.

Referring to FIG. 4, the hairpins are schematically depicted to show the general configuration. The hairpins are generally U-shaped and include a pair of legs joined by a crown. Each of a plurality of hairpins are installed in the stator core 32 by routing each leg portion through a corresponding one of the slots 34. Each hairpin may be installed from the same end of the stator core 32 (e.g., from end 36) so that once installed all of the crowns are located on one end of the stator, and the ends of the legs all are located on the opposing end (e.g., end 38). Generally, end 36 may be referred to as the crown end and end 38 may be referred to as the weld end. Once installed, the legs of the hairpins are bent away from each other to form twists that connect with the twists of other hairpins. The ends of corresponding hairpins are joined by an electrically conductive connection such as a weld. The connections may be arranged in rows. The windings 40 may be jumper-less (i.e., each hairpin is interconnected to another hairpin directly) or may include a minimum number of jumpers. A jumper is a conductor that is typically disposed at one of the ends of the stator core, i.e., does not extend through a slot, and interconnects hairpins that are spaced far enough apart that they cannot be directly connected to each other. Jumpers add material to the windings and require additional manufacturing. Costs can be reduced, and manufacturing efficiencies can be gained, by designing windings that do not require jumpers or only have a minimum number of jumpers (e.g., one to three jumpers).

Each arrangement may include hairpins as described in FIG. 4. Hairpin 90 may be formed from a single piece of metal such as copper, aluminum, silver, or any other electrically conductive material. The hairpin 90 may include a first leg 98 joined to a second leg 100 at a vertex 102. The first leg 98 is disposed within in one of the slots 34 and the second leg 100 is disposed in another of the slots 34 that is spaced apart by a span of slots. The hairpin 90 may have a span seven slots between the first leg 98 and the second leg 100. Thus, if the first leg 98 was in Slot 1, the second leg 100 would be in Slot 8. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a twist portion 110 that is angled outward at a second bend 108. The second leg 100 includes a straight portion 101 disposed within a slot 34 and a first angled portion 112 that extends between the vertex 102 and the straight portion 101. The first and second angled portions 104, 112 and the vertex by be collectively referred to as a crown. The straight portion 101 and the angled portion 112 are joined at a first bend 114. The second leg 100 also includes a twist portion 120 that is angled outward at a second bend 118. The twists 110, 120 are angled in opposing directions to extend away from the hairpin 90 to connect with adjacent pins of the wiring path. The twists 110, 120 may have a pitch span that is equal to the pin span between adjacent hairpins divided by 2, which in the example of FIG. 4 is 2.5 (5/2) in the illustrated embodiment. Thus, the pins 90 have a total pitch span of twelve slots.

The hairpin 90 may be fabricated by first forming the vertex 102, the first angled portions 104, 112, and two extended straight portions. Then, the hairpin 90 is installed into the stator 22 by inserting the extended straight portions into the slots 34 of the stator 22. The second bends 108, 118 and the twists 110, 120 may be formed after the hairpin 90 is installed through the slots by bending the extended legs as desired. The first and last regular pins of a wiring path may have a longer or shorter twist to facilitate connection with the terminal leads or neutral connections.

A neutral connection 52 may include a body such as a strip of conductive metal or other material. The neutral connection 52 includes openings that connect with hairpins. In the examples of the present disclosure, the neutral connection defines six openings grouped in pairs of two. Each of the groupings are associated with one of the phases such that each of the U phase, the V phase, and the W phase are allocated two openings. The neutral connection 52 may be connected directly to the twist portions of hairpins that are positioned at a most radially inward position of the hairpins (i.e., the neutral connection may be connected to hairpins located at the eighth position L8). The twist portions that connect to the neutral connection 52 do not need to be lengthened to accommodate the weld portion since there is sufficient clearance for the neutral connection 52 to be attached to the inside of the most radially inward hairpins.

Figure 5:
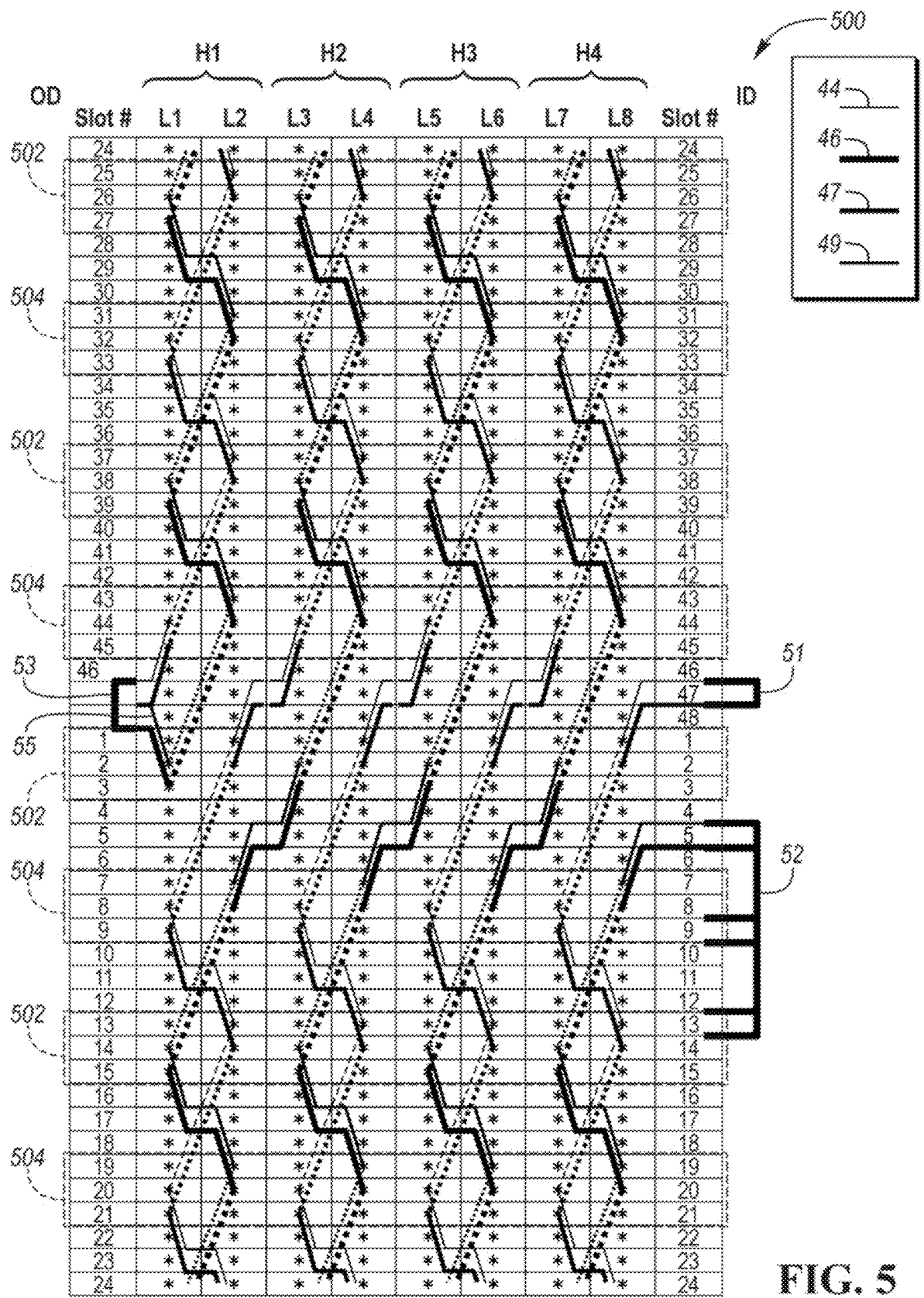
FIG. 5 is a winding diagram of a first of three phases of the stator winding looking from a weld side of the stator.
Figure 6:
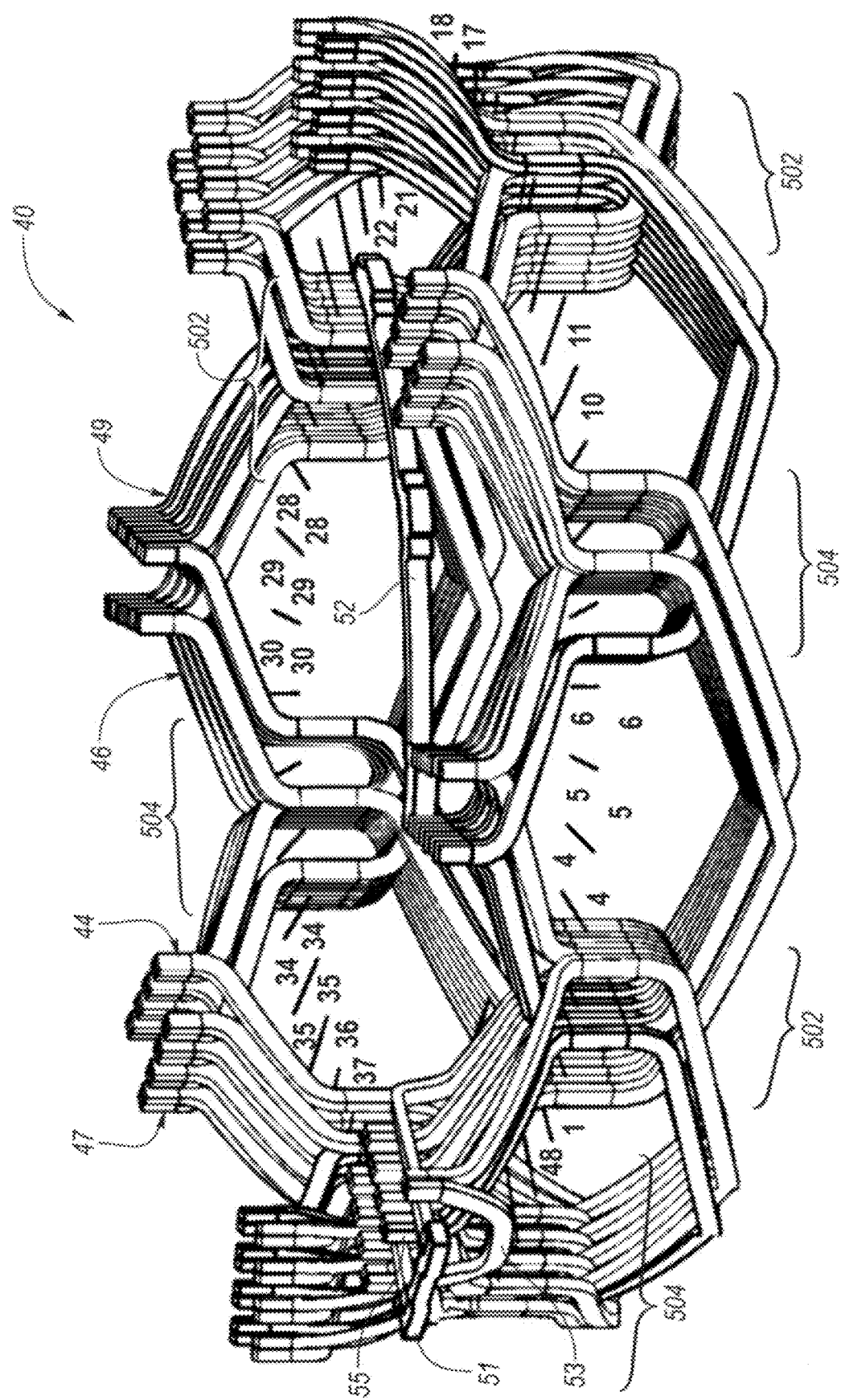
FIG. 6 is a perspective view of the first of three phases of the stator winding configuration.

Referring to FIGS. 5 and 6, a winding diagram 500 of a U phase of the winding 40 looking from a weld side of the stator and a physical embodiment of the U phase of winding 40 are illustrated, respectively. Each column represents a slot location of the stator stack segments having reference numbers from 1 through 48. Each row represents a radial layer positioned within each respective slot having references L1 toward the outer diameter side through L8 toward the inner diameter side. As discussed above, the positions within the slots are generally arranged as paired radial layers having references H1 though H4. The outermost radial layer H1 includes both the first position L1 and the second position L2. The outer middle radial layer H2 includes both the third position L3 and the fourth position L4. The inner middle radial layer H3 includes both the fifth position L5 and the sixth position L6. The innermost radial layer H4 includes both the seventh position L7 and the eighth position L8.

The U phase may include a first path (U1) 44, a second path (U2) 46, a third path (U3) 47, and a fourth path (U4) 49. The paths are formed by a plurality of interconnected hairpins disposed within the slots around the circumference of the stator. In the example of the present disclosure, each of the paths of interconnected hairpins includes sixteen pins that are connected end-to-end to form a continuous conductor. The first path 44 and the second path 46 are connected in series via a jumper 53 and extend between a U-phase terminal 51 that is connected to a power source (e.g., a battery) and the neutral connection 52. The third path 47 and the fourth path 49 are connected in series via a counter twisted pin 55 that is disposed at an end of the fourth path 49. The third path 47 and the fourth path 49 also extend between the terminal 51 that is connected to a power source and the neutral connection 52. The series circuit that is formed by the first path 44 and the second path 46 may be in parallel with the series circuit that is formed by the third path 47 and the fourth path 49 between the terminal 51 and the neutral connection 52. The first path 44 and third path 47 each include a first end that starts at the U-phase terminal 51 on the inner diameter side of the stator, and each include a second end that ends on the outer diameter side of the stator. The first path 44 and the third path 47 may each wind around the stator core approximately four times. As the pins are routed circumferentially around the stator, select locations index across layers H4 through H1 so that the paths end on the outer diameter side.

The second path 46 starts at the second end of the first path 44, and the fourth path 49 starts at the second end of the third path 47. Based on the slot locations of the example of FIG. 5, the connection between the first path 44 and the second path 46 is made via jumper connection 53, and the connection between the third path 47 and the fourth path 49 is made directly without a jumper via counter twisted pin 55. The second path 46 and fourth path 49 also include plurality of interconnected pins routed circumferentially around the stator and having select locations that index across layers H1 through H4 so that the paths end on the inner diameter side. The second path 46 and fourth path 49 may each wind around the stator core approximately four times and end near the ID 28 at the inboard neutral connection 52. Each of the second path 46 and fourth path 49 are connected to the neutral connection 52 on the inner diameter side. While the location of the neutral connection is provided by way of example, it should be appreciated that other locations may be suitable based on the particular application. The series connections of two of the paths effectively creates two parallel paths of the of the U phase.

Diagram 500 represents combination single-layer and double-layer configuration where only one phase passes through some of respective stator slots and more than one phase passes through other respective stator slots. Regions 502 and 504 each represent a configuration of three sequential slots. In each region 502 and 504, the slot that is in in the center of the region has all eight pin positions L1 through L8 occupied by the single U phase while the remaining two slots in each region that straddle and are disposed on opposing side of the central slot of their respective region has every other pin position (i.e., half of the pin positions) occupied by the U phase while the remaining slots are occupied by one of the V phase or W phase.

In each of the regions labeled 502, the lowest sequentially numbered slot has every other pin position occupied by hairpins from the first path 44 of the U phase while the remining pin positions are occupied by hairpins from the W phase 58 (i.e., hairpins from the first path 44 of the U phase are interleaved or are arranged in alternating manner with the hairpins from the W phase 58), the second sequentially numbered slot (or central slot) in each of the regions labeled 502 has all of the pin positions occupied by hairpins of the U phase in alternating or interleave manner between hairpins from the third path 47 and the fourth path 49, and the highest sequentially numbered slot in each of the regions labeled 502 has every other pin position occupied by hairpins from the second path 46 of the U phase while the remining pin positions are occupied by hairpins from the V phase 60 (i.e., hairpins from the second path 46 of the U phase are interleaved or are arranged in alternating manner with the hairpins from the V phase 60). An example of one of the regions 502 is illustrated in FIG. 3.

In each of the regions labeled 504, the lowest sequentially numbered slot has every other pin position is occupied by hairpins from the fourth path 49 of the U phase while the remining pin positions are occupied by hairpins from the W phase 58 (i.e., hairpins from the fourth path 49 of the U phase are interleaved or are arranged in alternating manner with the hairpins from the W phase 58), the second sequentially numbered slot (or central slot) in each of the regions labeled 504 has all of the pin positions occupied by hairpins of the U phase in alternating or interleave manner between hairpins from the first path 44 and the second path 46, and the highest sequentially numbered slot in each of the regions labeled 504 has every other pin position occupied by hairpins from the third path 47 of the U phase while the remining pin positions are occupied by hairpins from the V phase 60 (i.e., hairpins from the third path 47 of the U phase are interleaved or are arranged in alternating manner with the hairpins from the V phase 60).

The pattern at which the paths 44, 46, 47, and 49 of the U-phase occupy the pin positions within each of the regions 502 may be referred to as the first pattern. The first pattern is repeated at each pitch span of twelve slots or at angular intervals of 90° along the stator core 32. The pattern at which the paths 44, 46, 47, and 49 of the U-phase occupy the pin positions within each of the regions 504 may be referred to as the second pattern. The second pattern is also repeated at each pitch span of twelve slots or at angular intervals of 90° along the stator core 32. Each repeat of the first pattern is offset relative to each repeat of the second pattern by a pitch span of six slots or an angular interval of 45° along the stator core 32.

The V phase and W phase may be arranged in the same manner described above with respect to the U phase, particularly with respect to FIGS. 5 and 6. For example, each of the V phase and W phase may each include four paths that are arranged according the electrical connection (e.g. first and second paths are connected in series, where the first and second paths are in parallel with third and fourth paths which are connected in series) and patterns (e.g., the first and second patterns of regions 502 and 504) described with respect to the U phase in FIGS. 5 and 6. The V phase and W phase, however, are offset from the U phase. For example, the V phase may be offset relative to the U-phase by a pitch span of two slots or at angular interval of 15° along the stator core 32 while the W phase may be offset relative to the U phase by a pitch span of four slots or at angular interval of 30° along the stator core 32, or vice versa.

It should be understood that the designations of first, second, third, fourth, etc. for electrical paths, phases, patterns, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine comprising:
    a stator core defining slots that are circumferentially arranged between an inner diameter and an outer diameter of the stator core, each slot having a plurality of pin positions that is arranged in a direction that extends from the inner diameter toward the outer diameter; and
    a hairpin winding having first, second, third, and fourth paths of interconnected hairpins that correspond to a first electrical phase of the electric machine,
        wherein the first, second, third, and fourth paths are arranged to occupy a portion of the pin positions according to a first pattern that repeats at angular intervals along a circumference of the stator core,
        wherein the first pattern includes,
            hairpins from the first and second paths occupying each pin position within a first of the slots,
            hairpins from the third path occupying exactly half the pin positions within a second of the slots, and
            hairpins from the fourth path occupying exactly half the pin positions within a third of the slots, and
        wherein the second and third of the slots straddle the first of the slots.

2. The electric machine of claim 1, wherein hairpins from the first and second paths are interleaved to occupy each pin position within the first of the slots at each repeat of the first pattern.

3. The electric machine of claim 1, wherein the slots includes forty-eight total slots and a pitch between each repeat of the first pattern is twelve slots.

4. The electric machine of claim 1, wherein the first, second, third, and fourth paths are arranged to occupy a portion of the pin positions according to a second pattern that repeats at angular intervals along the circumference of the stator core, and wherein the second pattern includes,
    hairpins from the third and fourth paths occupying each pin position within a fourth of the slots,
    hairpins from the first path occupying exactly half the pin positions within a fifth of the slots, and
    hairpins from the second path occupying exactly half the pin positions within a sixth of the slots, and
wherein the fifth and sixth of the slots straddle the fourth of the slots.

5. The electric machine of claim 4, wherein the slots include forty-eight total slots and a pitch between each repeat of the second pattern is twelve slots.

6. The electric machine of claim 5, wherein each repeat of the first pattern is offset from each repeat of the second pattern by six slots.

7. The electric machine of claim 4, wherein hairpins from the third and fourth paths are interleaved to occupy each pin position within the fourth of the slots at each repeat of the second pattern.

8. The electric machine of claim 1, wherein the first and second paths are electrically connected in series.

9. The electric machine of claim 8, wherein the third and fourth paths are electrically connected in series.

10. An electric machine comprising:
    a stator core defining slots that are circumferentially arranged between an inner diameter and an outer diameter of the stator core, each slot having a plurality of pin positions that is arranged in a direction that extends from the inner diameter toward the outer diameter; and
    a hairpin winding having first, second, third, and fourth paths of interconnected hairpins that correspond to a first electrical phase of the electric machine,
        wherein the first, second, third, and fourth paths are arranged to occupy a portion of the pin positions according to first and second patterns that repeat at angular intervals along a circumference of the stator core,
        wherein the first pattern includes,
            hairpins from the first and second paths occupying pin positions within a first of the slots,
            hairpins from the third path occupying pin positions within a second of the slots, and
            hairpins from the fourth path occupying pin positions within a third of the slots, wherein hairpins from the third path occupy exactly half the pin positions within the second of the slots and hairpins from the fourth path occupy exactly half the pin positions within the third of the slots,
        wherein the second and third of the slots are disposed on opposing sides of the first of the slots,
        wherein the second pattern includes,
            hairpins from the third and fourth paths occupying pin positions within a fourth of the slots,
            hairpins from the first path occupying pin positions within a fifth of the slots, and
            hairpins from the second path occupying pin positions within a sixth of the slots, and
        wherein the fifth and sixth of the slots are disposed on opposing sides of the fourth of the slots.

11. The electric machine of claim 10, wherein hairpins from the first and second paths are interleaved to occupy each pin position within the first of the slots at each repeat of the first pattern.

12. The electric machine of claim 10, wherein hairpins from the third and fourth paths are interleaved to occupy each pin position within the fourth of the slots at each repeat of the second pattern.

13. The electric machine of claim 10, wherein the slots include forty-eight total slots and a pitch between each repeat of the first pattern is twelve slots.

14. The electric machine of claim 13, wherein a pitch between each repeat of the second pattern is twelve slots.

15. The electric machine of claim 13, wherein each repeat of the first pattern is offset from each repeat of the second pattern by six slots.

16. The electric machine of claim 10, wherein hairpins from the first path occupy exactly half the pin positions within the fifth of the slots and hairpins from the second path occupy exactly half the pin positions within a sixth of the slots.

17. The electric machine of claim 10, wherein the first and second paths are electrically connected in series.

18. The electric machine of claim 17, wherein the third and fourth paths are electrically connected in series.

19. An electric machine comprising:
   a stator core defining slots that are circumferentially arranged between an inner diameter and an outer diameter of the stator core, each slot having a plurality of pin positions that is arranged in a direction that extends from the inner diameter toward the outer diameter; and
   a hairpin winding having first, second, third, and fourth paths of interconnected hairpins that correspond to a first electrical phase of the electric machine,
      wherein the first, second, third, and fourth paths are arranged to occupy a portion of the pin positions according to first and second patterns that repeat at angular intervals along a circumference of the stator core,
   wherein the first pattern includes,
      hairpins from the first and second paths occupying pin positions within a first of the slots,
      hairpins from the third path occupying pin positions within a second of the slots, and
      hairpins from the fourth path occupying pin positions within a third of the slots,
   wherein the second and third of the slots are disposed on opposing sides of the first of the slots,
   wherein the second pattern includes,
      hairpins from the third and fourth paths occupying pin positions within a fourth of the slots,
      hairpins from the first path occupying pin positions within a fifth of the slots, and
      hairpins from the second path occupying pin positions within a sixth of the slots, wherein hairpins from the first path occupy exactly half the pin positions within the fifth of the slots and hairpins from the second path occupy exactly half the pin positions within the sixth of the slots, and
   wherein the fifth and sixth of the slots are disposed on opposing sides of the fourth of the slots.

* * * * *